(12) United States Patent
Huang et al.

(10) Patent No.: US 11,586,646 B2
(45) Date of Patent: *Feb. 21, 2023

(54) TRANSFORMING DATA STRUCTURES AND DATA OBJECTS FOR MIGRATING DATA BETWEEN DATABASES HAVING DIFFERENT SCHEMAS

(71) Applicant: Bank of America Corporation, Charlotte, NC (US)

(72) Inventors: Tao Huang, Bellevue, WA (US); Sriharsha Jana, Seattle, WA (US)

(73) Assignee: Bank of America Corporation, Charlotte, NC (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/307,668

(22) Filed: May 4, 2021

(65) Prior Publication Data
US 2021/0256033 A1  Aug. 19, 2021

Related U.S. Application Data

(63) Continuation of application No. 16/672,573, filed on Nov. 4, 2019, now Pat. No. 11,030,213, which is a (Continued)

(51) Int. Cl.
*G06F 16/00* (2019.01)
*G06F 16/25* (2019.01)
(Continued)

(52) U.S. Cl.
CPC ......... *G06F 16/258* (2019.01); *G06F 16/214* (2019.01); *G06F 16/24554* (2019.01)

(58) Field of Classification Search
CPC ...... G06F 16/254; G06F 16/211; G06F 16/25; G06F 16/27; G06F 16/9535; G06F 21/10;
(Continued)

(56) References Cited

U.S. PATENT DOCUMENTS 9,450,944 B1  9/2016 Sousley et al.
9,454,537 B2  9/2016 Prahlad et al.
(Continued)

OTHER PUBLICATIONS

US 9,590,866 B2, 03/2017, Newton et al. (withdrawn)
(Continued)

*Primary Examiner* — Yicun Wu
(74) *Attorney, Agent, or Firm* — Banner & Witcoff, Ltd.

(57) ABSTRACT

Aspects of the disclosure relate to transforming data structures and data objects. A computing platform may query a logical view of a data table associated with a first database maintained by a first database server in a first schema and may receive source data associated with the logical view. Subsequently, the computing platform may split the source data into a plurality of data chunks associated with the logical view. Next, the computing platform may move the plurality of data chunks to a plurality of nodes configured to receive and transform the plurality of data chunks from the first schema to a second schema different from the first schema. Then, the computing platform may command the plurality of nodes to transform the plurality of data chunks and may move the transformed data from the plurality of nodes to a second database maintained by a second database server in the second schema.

20 Claims, 8 Drawing Sheets

Related U.S. Application Data continuation of application No. 15/454,471, filed on Mar. 9, 2017, now Pat. No. 10,540,366.

(51) Int. Cl.
*G06F 16/21* (2019.01)
*G06F 16/2455* (2019.01)

(58) Field of Classification Search
CPC ........... G06F 16/2228; G06F 16/24554; G06F 16/248; G06F 16/903; G06F 16/93; G06F 8/20; G06F 8/34; G06F 8/35; G06F 16/221; G06F 16/2272; G06F 16/2282; G06F 16/252; G06F 16/278; G06F 16/9038; G06F 21/604; G06F 21/6218; G06F 21/6227; G06F 9/451; G06F 11/0793; G06F 11/10; G06F 11/1008; G06F 11/1076; G06F 16/00; G06F 16/2365; G06F 16/258; G06F 17/2725; G06F 2201/80; G06F 3/0607; G06F 3/0635; G06F 3/0664; G06F 3/067; G06F 8/433; G06F 12/0261; G06F 16/21; G06F 16/213; G06F 16/214; G06F 16/2219; G06F 16/2379; G06F 16/9017; G06F 17/227; G06F 1/10; G06F 1/3287; G06F 1/3296; G06F 2212/1044; G06F 8/00; G06F 9/4493; G06F 9/45504; G06F 9/4862

See application file for complete search history.

(56) References Cited

U.S. PATENT DOCUMENTS

| | | | |
|---|---|---|---|
| 9,460,142 B2 | 10/2016 | Mielenhausen | |
| 9,460,171 B2 | 10/2016 | Marrelli et al. | |
| 9,461,876 B2 | 10/2016 | Van Dusen et al. | |
| 9,467,500 B2 | 10/2016 | Maturana et al. | |
| 9,471,617 B2 | 10/2016 | Mielenhausen | |
| 9,473,374 B2 | 10/2016 | Beaty et al. | |
| 9,483,201 B2 | 11/2016 | Kripalani | |
| 9,483,361 B2 | 11/2016 | Gokhale et al. | |
| 9,483,362 B2 | 11/2016 | Gokhale et al. | |
| 9,483,363 B2 | 11/2016 | Gokhale et al. | |
| 9,483,364 B2 | 11/2016 | Gokhale et al. | |
| 9,483,461 B2 | 11/2016 | Fleizach et al. | |
| 9,483,558 B2 | 11/2016 | Brower, Jr. et al. | |
| 9,485,311 B2 | 11/2016 | Kripalani et al. | |
| 9,491,201 B2 | 11/2016 | Bagepalli et al. | |
| 9,495,129 B2 | 11/2016 | Fleizach et al. | |
| 9,495,251 B2 | 11/2016 | Kottomtharayil et al. | |
| 9,502,031 B2 | 11/2016 | Paulik et al. | |
| 9,503,927 B2 | 11/2016 | Rubin et al. | |
| 9,507,837 B2 | 11/2016 | Fan et al. | |
| 9,509,684 B1 | 11/2016 | Dixson-Boles et al. | |
| 9,519,695 B2 | 12/2016 | Sampathkumaran et al. | |
| 9,535,776 B2 | 1/2017 | Klose | |
| 9,535,906 B2 | 1/2017 | Lee et al. | |
| 9,535,912 B2 | 1/2017 | Guo | |
| 9,540,430 B2 | 1/2017 | Schellenberger et al. | |
| 9,542,469 B2 | 1/2017 | Batra et al. | |
| 9,548,050 B2 | 1/2017 | Gruber et al. | |
| 9,558,474 B2 | 1/2017 | Rao | |
| 9,563,514 B2 | 2/2017 | Dornemann | |
| 9,563,518 B2 | 2/2017 | Klose | |
| 9,563,679 B2 | 2/2017 | Seto | |
| 9,569,491 B2 | 2/2017 | Sankaranarayanan et al. | |
| 9,575,673 B2 | 2/2017 | Mitkar et al. | |
| 9,575,804 B2 | 2/2017 | Kochunni et al. | |
| 9,576,574 B2 | 2/2017 | van Os | |
| 9,582,510 B2 | 2/2017 | Tabenkin et al. | |
| 9,582,524 B1 | 2/2017 | Murali et al. | |
| 9,582,598 B2 | 2/2017 | Kalgi | |
| 9,582,608 B2 | 2/2017 | Bellegarda | |
| 9,588,704 B2 | 3/2017 | Mutha et al. | |
| 9,588,849 B2 | 3/2017 | Sinha | |
| 11,200,213 B1 * | 12/2021 | Courchaine | G06F 16/951 |
| 2014/0279834 A1 | 9/2014 | Tsirogiannis et al. | |

OTHER PUBLICATIONS

US 9,590,867 B2, 03/2017, Newton et al. (withdrawn)
US 9,590,868 B2, 03/2017, Varney et al. (withdrawn)
US 9,590,869 B2, 03/2017, Varney et al. (withdrawn)
US 9,590,870 B2, 03/2017, Crowder et al. (withdrawn)
US 9,590,871 B2, 03/2017, Varney et al. (withdrawn)
"NoSQL," from Wikipedia, the free enclyclopedia, retrieved Mar. 6, 2017 from https://en.wikipedia.org/wiki/NoSQL, 9 pages.
"SQL," from Wikipedia, the free enclyclopedia, retrieved Mar. 6, 2017 from https://en.wikipedia.org/wiki/SQL, 18 pages.
Apr. 18, 2019 U.S. Non-Final Office Action—U.S. Appl. No. 15/454,471.
Oct. 10, 2019 U.S. Notice of Allowance and Fees Due—U.S. Appl. No. 15/454,471.

* cited by examiner

TRANSFORMING DATA STRUCTURES AND DATA OBJECTS FOR MIGRATING DATA BETWEEN DATABASES HAVING DIFFERENT SCHEMAS

CROSS-REFERENCE TO RELATED APPLICATIONS

This application claims the benefit of and is a continuation of U.S. patent application Ser. No. 16/672,573, filed Nov. 4, 2019, and entitled "Transforming Data Structures and Data Objects for Migrating Data Between Databases Having Different Schemas," which claims the benefit of and is a continuation of U.S. patent application Ser. No. 15/454,471, filed Mar. 9, 2017, and entitled "Transforming Data Structures and Data Objects for Migrating Data Between Databases Having Different Schemas." Each of the foregoing applications is incorporated by reference herein in its entirety.

BACKGROUND

Aspects of the disclosure relate to data processing, database management, and transforming data structures and data objects. In particular, one or more aspects of the disclosure relate to transforming data structures and data objects to transfer data between databases having different schemas.

Enterprise organizations may maintain large amounts of data in various electronic resources, including large enterprise databases. As organizations seek to increase the performance, efficiency, and security of the information technology infrastructure that maintains this data, it may be necessary to migrate and/or otherwise transfer data between different databases that utilize different schemas. In many instances, however, transferring such data may be difficult, as such transferring may require consuming large amounts of computing power, network bandwidth, and other technological resources.

SUMMARY

Aspects of the disclosure provide effective, efficient, scalable, and convenient technical solutions that address and overcome the technical problems associated with transferring data between different databases that utilize different schemas. In particular, some aspects utilize techniques in which a logical view is queried to read data from a source database and to facilitate node-based processing and transformation of the data into a different schema, as illustrated in greater detail below.

In accordance with one or more embodiments, a computing platform having at least one processor, a memory, and a communication interface may query a logical view of a data table associated with a first database maintained by a first database server in a first schema. Responsive to querying the logical view of the data table associated with the first database maintained by the first database server in the first schema, the computing platform may receive, via the communication interface, from the first database server, source data associated with the logical view. Subsequently, the computing platform may split the source data associated with the logical view to produce a plurality of data chunks associated with the logical view. Next, the computing platform may move the plurality of data chunks associated with the logical view to a plurality of nodes associated with the computing platform, and each node of the plurality of nodes associated with the computing platform may be configured to receive a particular data chunk of the plurality of data chunks associated with the logical view and transform the particular data chunk of the plurality of data chunks associated with the logical view from the first schema to a second schema different from the first schema. Then, the computing platform may command the plurality of nodes associated with the computing platform to transform the plurality of data chunks associated with the logical view to produce transformed data. Thereafter, the computing platform may move the transformed data from the plurality of nodes associated with the computing platform to a second database maintained by a second database server in the second schema.

In some embodiments, prior to querying the logical view of the data table associated with the first database maintained by the first database server in the first schema, the computing platform may receive, via the communication interface, from an administrative computing device, a data migration command. Responsive to receiving the data migration command from the administrative computing device, the computing platform may generate a view command directing the first database server to create the logical view of the data table associated with the first database maintained by the first database server. Subsequently, the computing platform may send, via the communication interface, to the first database server, the view command directing the first database server to create the logical view of the data table associated with the first database maintained by the first database server.

In some embodiments, the view command directing the first database server to create the logical view of the data table associated with the first database maintained by the first database server may be configured to cause the first database server to execute a script that creates the logical view of the data table associated with the first database maintained by the first database server.

In some embodiments, the logical view of the data table associated with the first database maintained by the first database server may include a numerical column. In some instances, the first schema may be a relational database schema. In some instances, the second schema may be a non-relational database schema.

In some embodiments, splitting the source data associated with the logical view to produce the plurality of data chunks associated with the logical view may include identifying one or more available nodes and determining a uniform size of the plurality of data chunks associated with the logical view based on the one or more available nodes. In some instances, a numerical column included in the logical view of the data table associated with the first database maintained by the first database server may provide an index indicative of a total size of the source data associated with the logical view. In addition, splitting the source data associated with the logical view to produce the plurality of data chunks associated with the logical view may include splitting the source data associated with the logical view based on the numerical column.

In some embodiments, the plurality of nodes associated with the computing platform may be configured to process the plurality of data chunks associated with the logical view in parallel.

In some embodiments, commanding the plurality of nodes associated with the computing platform to transform the plurality of data chunks associated with the logical view to produce the transformed data may include initiating a data transformation process at the plurality of nodes associated with the computing platform and directing the plurality of nodes associated with the computing platform to transfer the transformed data to the second database maintained by the second database server when the data transformation process is completed.

In some embodiments, moving the transformed data from the plurality of nodes associated with the computing platform to the second database maintained by the second database server may include moving the transformed data from the plurality of nodes associated with the computing platform to the second database maintained by the second database server using at least one application programming interface function call provided by the second database server.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to transforming data structures and data objects to transfer data between databases having different schemas. In some arrangements discussed in greater detail below, a computing platform having at least one processor, a memory, and a communication interface may query a logical view of a data table associated with a first database maintained by a first database server in a first schema. Responsive to querying the logical view of the data table associated with the first database maintained by the first database server in the first schema, the computing platform may receive, via the communication interface, from the first database server, source data associated with the logical view. Subsequently, the computing platform may split the source data associated with the logical view to produce a plurality of data chunks associated with the logical view. Next, the computing platform may move the plurality of data chunks associated with the logical view to a plurality of nodes associated with the computing platform, and each node of the plurality of nodes associated with the computing platform may be configured to receive a particular data chunk of the plurality of data chunks associated with the logical view and transform the particular data chunk of the plurality of data chunks associated with the logical view from the first schema to a second schema different from the first schema. Then, the computing platform may command the plurality of nodes associated with the computing platform to transform the plurality of data chunks associated with the logical view to produce transformed data. Thereafter, the computing platform may move the transformed data from the plurality of nodes associated with the computing platform to a second database maintained by a second database server in the second schema.

Figure 1A:
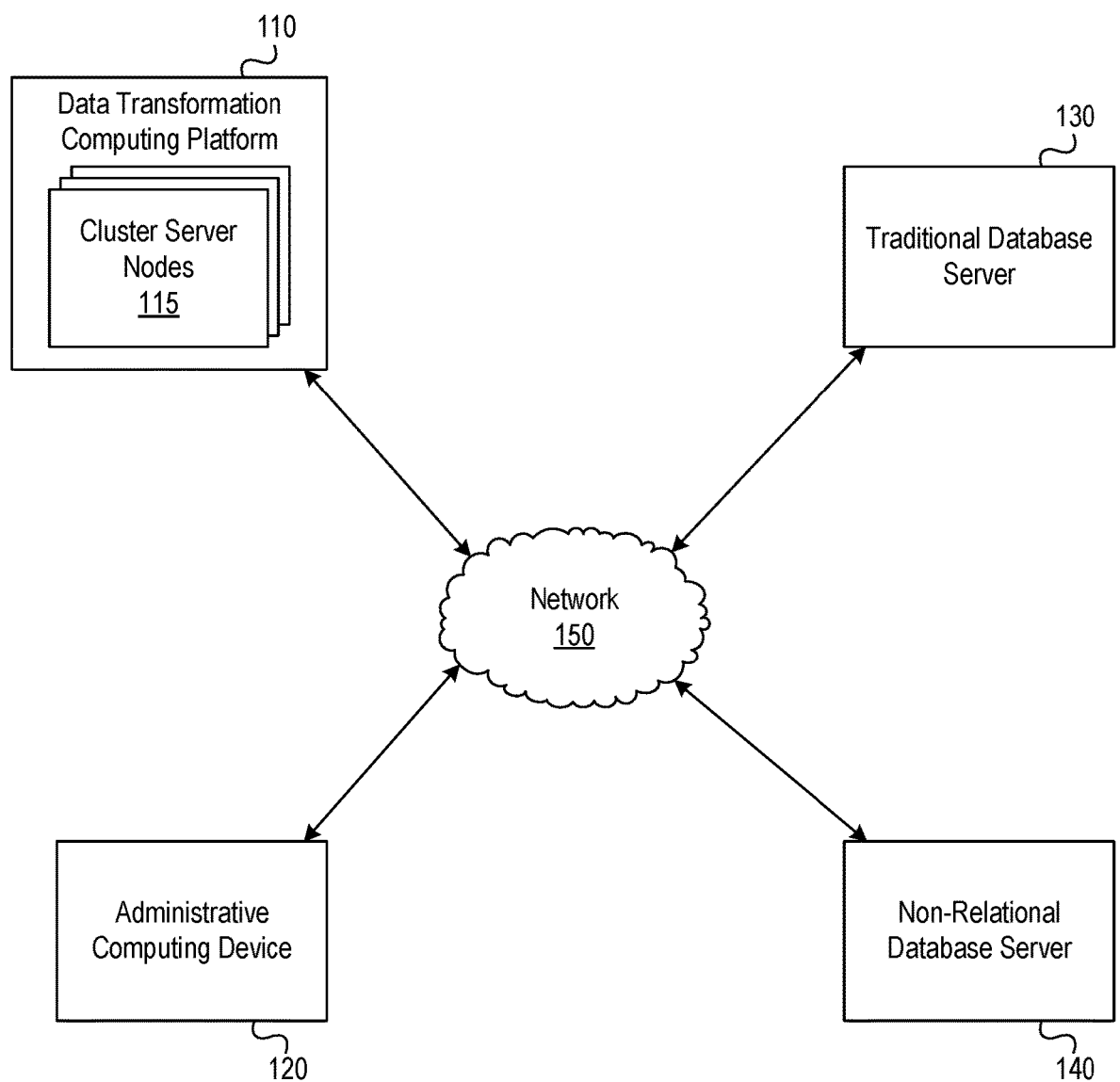
FIGS. 1A and 1B depict an illustrative computing environment for transforming data structures and data objects to transfer data between databases having different schemas in accordance with one or more example embodiments.
Figure 1B:
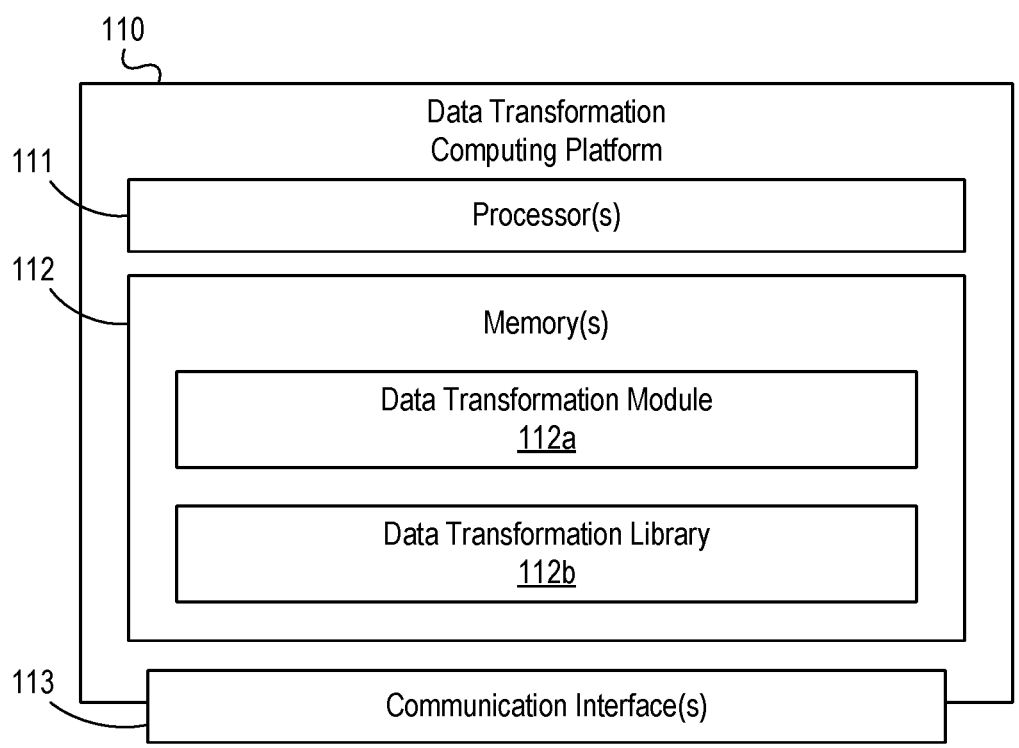

FIGS. 1A and 1B depict an illustrative computing environment for transforming data structures and data objects to transfer data between databases having different schemas in accordance with one or more example embodiments. Referring to FIG. 1A, computing environment 100 may include one or more computing platforms and one or more computing devices. For example, computing environment 100 may include a data transformation computing platform 110, and data transformation computing platform 110 may include cluster server nodes 115. Computing environment 100 also may include an administrative computing device 120, a traditional database server 130, and a non-relational database server 140.

As illustrated in greater detail below, data transformation computing platform 110 may include one or more computing devices configured to perform one or more of the functions described herein in addition to cluster server nodes 115. For example, data transformation computing platform 110 may include one or more computers (e.g., laptop computers, desktop computers, servers, server blades, or the like). Additionally, cluster server nodes 115 may be made up of and/or otherwise include one or more servers and/or server blades, which may be located at the same data center and/or one or more different data centers, and which may be monitored and/or controlled by data transformation computing platform 110 and/or one or more computers included in data transformation computing platform 110.

Administrative computing device 120 may be configured to provide one or more interfaces that allow for configuration and management of one or more other computing devices and/or computer systems included in computing environment 100. Traditional database server 130 may be configured to host and/or otherwise maintain one or more databases, such as one or more relational databases maintained in a relational schema, such as SQL. Non-relational database server 140 may be configured to host and/or otherwise maintain one or more databases, such as one or more non-relational databases maintained in a non-relational schema, such as NoSQL.

Computing environment 100 also may include one or more networks, which may interconnect one or more of data transformation computing platform 110, cluster server nodes 115, administrative computing device 120, traditional database server 130, and non-relational database server 140. For example, computing environment 100 may include network 150, which may include one or more public networks, one or more private networks, and/or one or more sub-networks (e.g., local area networks (LANs), wide area networks (WANs), or the like).

In some instances, the one or more databases (which may, e.g., be maintained by traditional database server 130 and/or non-relational database server 140) may store and/or otherwise include enterprise information associated with an organization operating one or more of data transformation computing platform 110, administrative computing device 120, traditional database server 130, and/or non-relational database server 140. For example, the one or more databases (which may, e.g., be maintained by traditional database server 130 and/or non-relational database server 140) may store and/or otherwise include user profile information, user authentication preferences information, and/or other user information associated with an organization operating one or more of data transformation computing platform 110, administrative computing device 120, traditional database server 130, and/or non-relational database server 140. In some instances, the user profile information, user authentication preferences information, and/or other user information may be associated with a customer portal, such as an online banking portal and/or a mobile banking portal, which may be provided by one or more servers included in computing environment 100 to one or more customers of the organization, such as a financial institution, who may use one or more client computing devices to access the portal and/or who may be authenticated to one or more portal user accounts by one or more servers included in computing environment 100 based on the user profile information, user authentication preferences information, and/or other user information associated with the organization operating one or more of data transformation computing platform 110, administrative computing device 120, traditional database server 130, and/or non-relational database server 140. Such portals may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like).

In one or more arrangements, administrative computing device 120, traditional database server 130, and non-relational database server 140 may be any type of computing device capable of receiving a user interface, receiving input via the user interface, and communicating the received input to one or more other computing devices. For example, administrative computing device 120, traditional database server 130, and non-relational database server 140 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of administrative computing device 120, traditional database server 130, and non-relational database server 140 may, in some instances, be special-purpose computing devices configured to perform specific functions.

Referring to FIG. 1B, data transformation computing platform 110 may include one or more processors 111, memory 112, and communication interface 113. A data bus may interconnect processor 111, memory 112, and communication interface 113. Communication interface 113 may be a network interface configured to support communication between data transformation computing platform 110 and one or more networks (e.g., network 150 or the like). Memory 112 may include one or more program modules having instructions that when executed by processor 111 cause data transformation computing platform 110 to perform one or more functions described herein and/or one or more libraries that may store and/or otherwise maintain information which may be used by such program modules and/or processor 111. In some instances, the one or more program modules and/or databases may be stored by and/or maintained in different memory units of data transformation computing platform 110 and/or by different computing devices that may form and/or otherwise make up data transformation computing platform 110. For example, memory 112 may have, store, and/or include a data transformation module 112a and a data transformation library 112b. Data transformation module 112a may have instructions that direct and/or cause data transformation computing platform 110 to transform data structures and data objects to transfer data between databases having different schemas, as discussed in greater detail below. Data transformation library 112b may store information used by data transformation module 112a and/or data transformation computing platform 110 in transforming data structures and data objects to transfer data between databases having different schemas and/or in performing other functions.

Figure 2A:
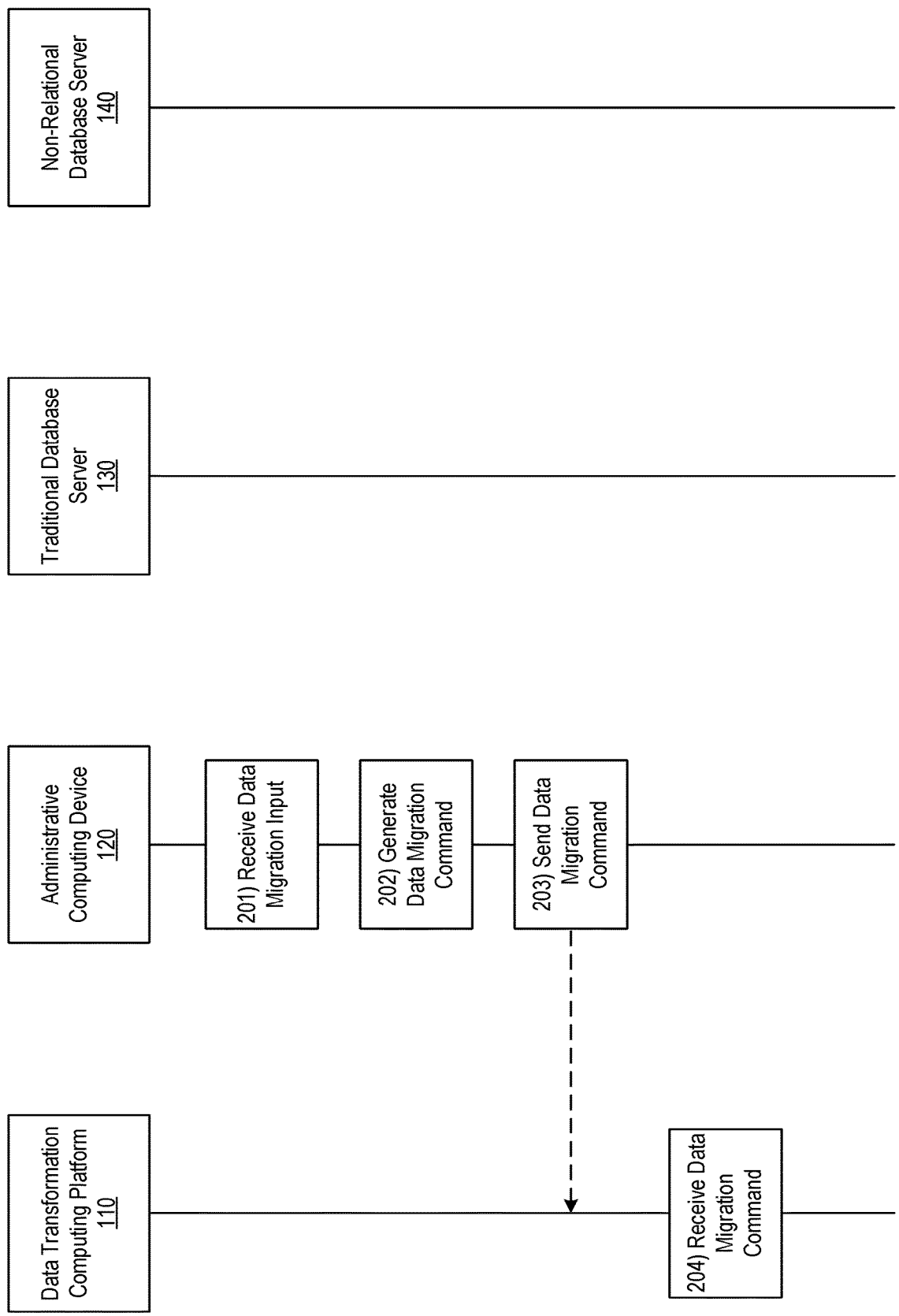
FIGS. 2A, 2B, 2C, and 2D depict an illustrative event sequence for transforming data structures and data objects to transfer data between databases having different schemas in accordance with one or more example embodiments.

FIGS. 2A, 2B, 2C, and 2D depict an illustrative event sequence for transforming data structures and data objects to transfer data between databases having different schemas in accordance with one or more example embodiments. Referring to FIG. 2A, at step 201, administrative computing device 120 may receive data migration input. For example, at step 201, administrative computing device 120 may receive data migration input from a user of administrative computing device 120 requesting to migrate and/or otherwise transfer data from a database hosted and/or otherwise maintained by traditional database server 130, such as a traditional and/or SQL database, to a different database hosted and/or otherwise maintained by non-relational database server 140, such as a non-relational and/or NoSQL database. At step 202, administrative computing device 120 may generate a data migration command. For example, at step 202, administrative computing device 120 may generate a data migration command requesting data transformation computing platform 110 to initiate the migration and/or transfer of data based on the data migration input received at step 201. At step 203, administrative computing device 120 may send the data migration command to data transformation computing platform 110.

Figure 3:
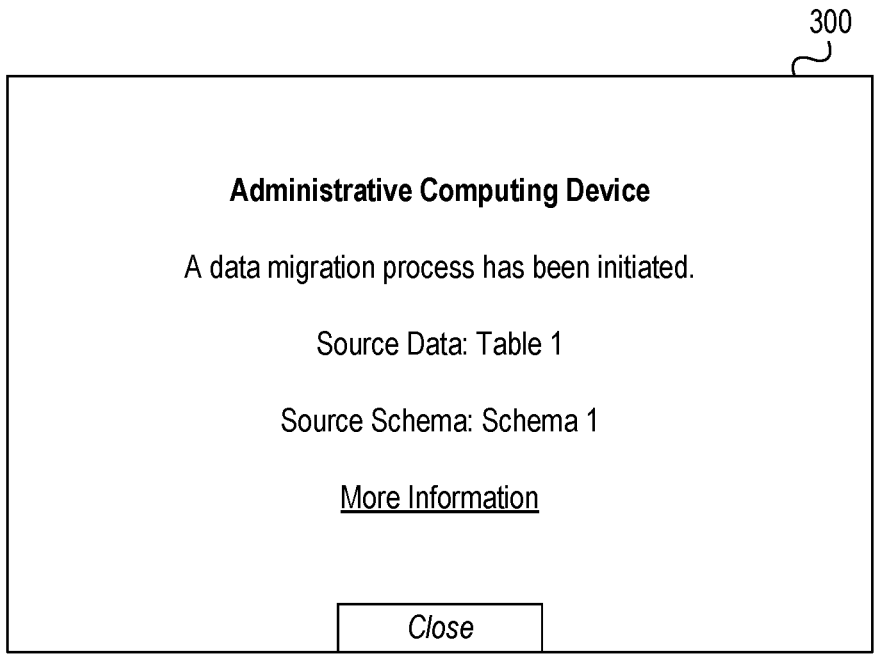
FIGS. 3 and 4 depict example graphical user interfaces for transforming data structures and data objects to transfer data between databases having different schemas in accordance with one or more example embodiments.

At step 204, data transformation computing platform 110 may receive the data migration command from administrative computing device 120. For example, at step 204, data transformation computing platform 110 may receive, via the communication interface (e.g., communication interface 113), from an administrative computing device (e.g., administrative computing device 120), a data migration command. In some instances, responsive to and/or after receiving the data migration command from administrative computing device 120, data transformation computing platform 110 may direct and/or otherwise cause a computing device, such as administrative computing device 120, to display and/or otherwise present a graphical user interface similar to graphical user interface 300, which is illustrated in FIG. 3. As seen in FIG. 3, graphical user interface 300 may include information notifying a user of administrative computing device 120 that a data migration process has been initiated, as well as information associated with the data migration process that has been initiated (e.g., "Source Data: Table 1; Source Schema: Schema 1; More Information").

Figure 2B:
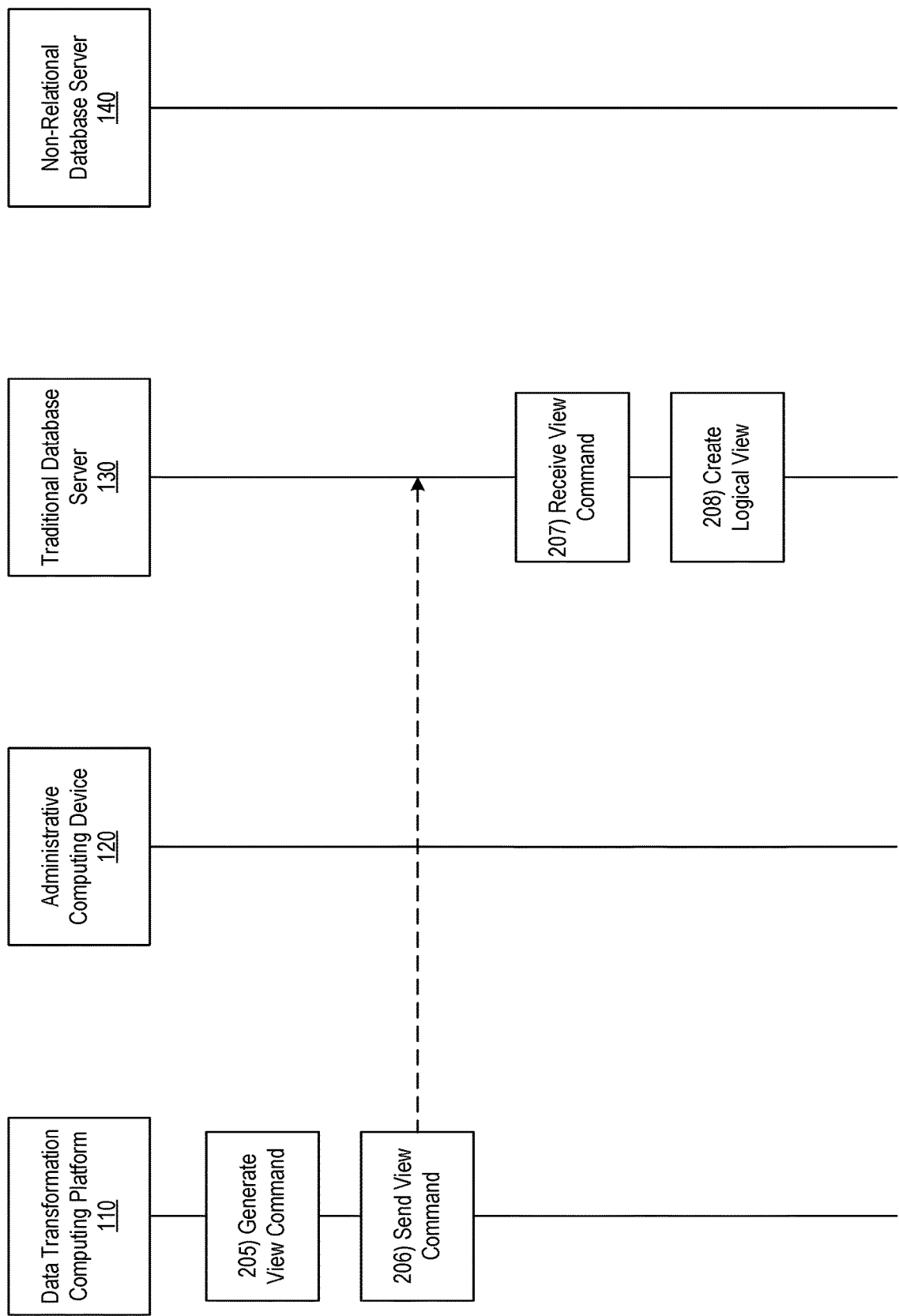

Referring to FIG. 2B, at step 205, data transformation computing platform 110 may generate a view command. For example, at step 205, responsive to receiving the data migration command from the administrative computing device (e.g., administrative computing device 120), data transformation computing platform 110 may generate a view command directing a first database server (e.g., traditional database server 130) to create a logical view of a data table associated with a first database maintained by the first database server (e.g., traditional database server 130). As illustrated in greater detail below, the logical view (which may, e.g., be created by traditional database server 130) may enable an application executing at data transformation computing platform 110 to transform and/or otherwise process the data from the data table associated with the first database maintained by the first database server (e.g., traditional database server 130) from a schema used by traditional database server 130 (e.g., a relational schema such as SQL) into a schema used by and/or corresponding to the target database and/or database server to which the data is being migrated and/or otherwise transferred, such as a non-relational scheme such as NoSQL.

At step 206, data transformation computing platform 110 may send the view command to traditional database server 130. For example, at step 206, data transformation computing platform 110 may send, via the communication interface (e.g., communication interface 113), to the first database server (e.g., traditional database server 130), the view command directing the first database server (e.g., traditional database server 130) to create the logical view of the data table associated with the first database maintained by the first database server (e.g., traditional database server 130).

In some embodiments, the view command directing the first database server to create the logical view of the data table associated with the first database maintained by the first database server may be configured to cause the first database server to execute a script that creates the logical view of the data table associated with the first database maintained by the first database server. For example, the view command (which may, e.g., be generated by data transformation computing platform 110 at step 205 and/or sent by data transformation computing platform 110 at step 206) directing the first database server (e.g., traditional database server 130) to create the logical view of the data table associated with the first database maintained by the first database server (e.g., traditional database server 130) may be configured to cause the first database server (e.g., traditional database server 130) to execute a script that creates the logical view of the data table associated with the first database maintained by the first database server (e.g., traditional database server 130). Such a script may, for instance, cause traditional database server 130 to create and/or persist the logical view of the data table.

At step 207, traditional database server 130 may receive the view command from data transformation computing platform 110. At step 208, traditional database server 130 may create the logical view based on receiving the view command from data transformation computing platform 110. For example, at step 208, traditional database server 130 may execute a script to create the logical view responsive to receiving the view command from data transformation computing platform 110.

Figure 2C:
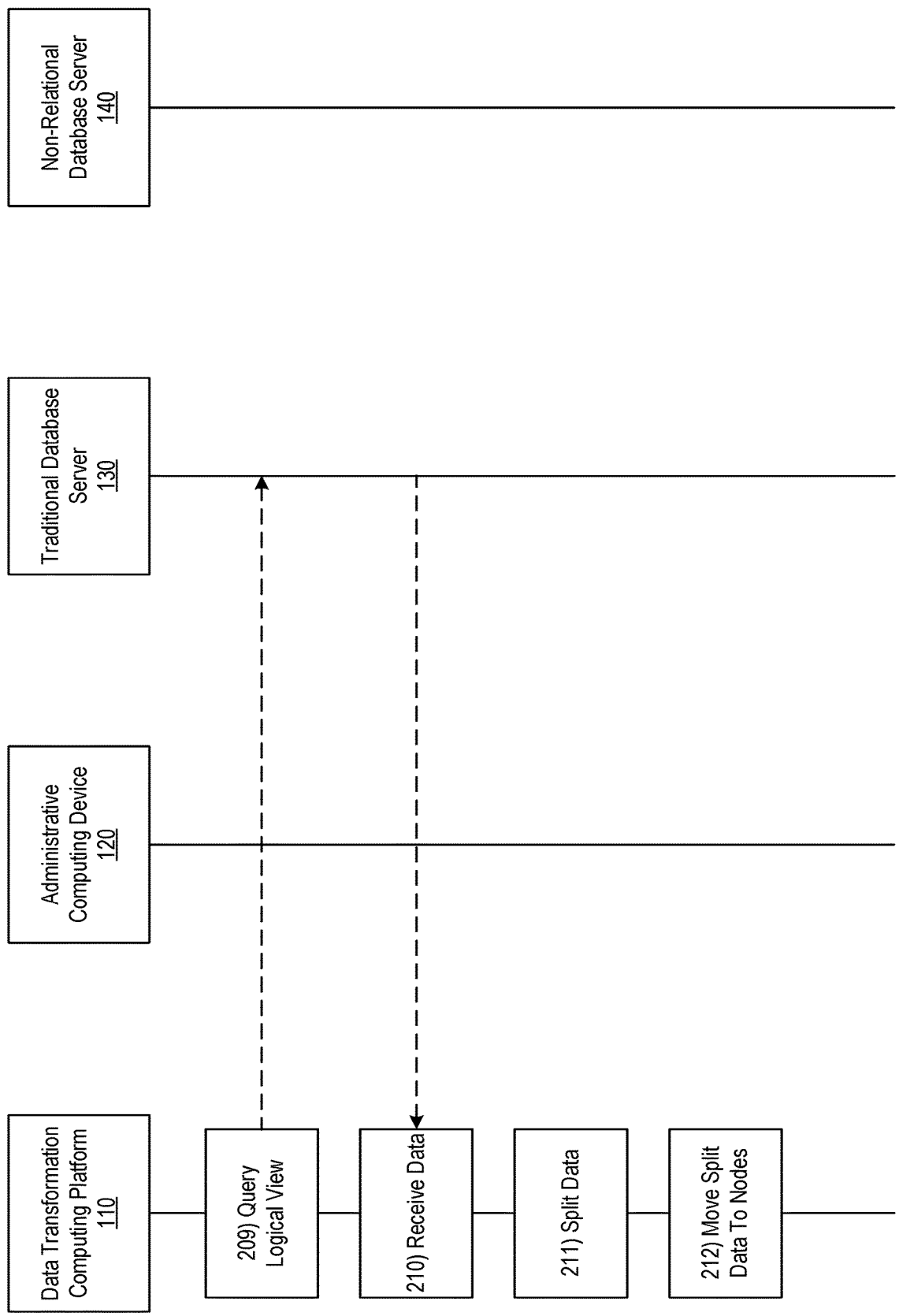

Referring to FIG. 2C, at step 209, data transformation computing platform 110 may query the logical created and/or persisted by traditional database server 130. For example, at step 209, data transformation computing platform 110 may query a logical view of a data table associated with a first database maintained by the first database server (e.g., traditional database server 130) in a first schema. In some embodiments, the logical view of the data table associated with the first database maintained by the first database server may include a numerical column. For example, the logical view (which may, e.g., be queried by data transformation computing platform 110 at step 209) of the data table associated with the first database maintained by the first database server (e.g., traditional database server 130) may include a numerical column. As discussed in greater detail below, the numerical column may provide an index of the data table associated with the first database maintained by the first database server (e.g., traditional database server 130) that may enable data transformation computing platform 110 to determine the size of the data table associated with the first database maintained by the first database server (e.g., traditional database server 130) so that the data included in the data table associated with the first database maintained by the first database server (e.g., traditional database server 130) may be split and transformed into a different schema at various nodes (e.g., cluster server nodes 115) controlled by data transformation computing platform 110.

At step 210, data transformation computing platform 110 may receive data from traditional database server 130, and such data may be returned by traditional database server 130 in response to the querying of the logical view performed by data transformation computing platform 110 at step 209. For example, at step 210, responsive to querying the logical view of the data table associated with the first database maintained by the first database server (e.g., traditional database server 130) in the first schema, data transformation computing platform 110 may receive, via the communication interface (e.g., communication interface 113), from the first database server (e.g., traditional database server 130), source data associated with the logical view.

At step 211, data transformation computing platform 110 may split the data received from traditional database server 130. For example, at step 211, data transformation computing platform 110 may split the source data associated with the logical view to produce a plurality of data chunks associated with the logical view. For instance, data transformation computing platform 110 may divide the data (which may, e.g., be received from traditional database server 130 in response to the querying of the logical view performed by data transformation computing platform 110 at step 209) into data chunks or other discrete sets and/or units of data that may enable transformation (e.g., from one schema to a different schema) and/or other processing of the data at various nodes controlled by data transformation computing platform 110, such as cluster server nodes 115.

In some embodiments, splitting the source data associated with the logical view to produce the plurality of data chunks associated with the logical view may include identifying one or more available nodes and determining a uniform size of the plurality of data chunks associated with the logical view based on the one or more available nodes. For example, in splitting the source data associated with the logical view to produce the plurality of data chunks associated with the logical view, data transformation computing platform 110 may identify one or more available nodes (e.g., one or more nodes of cluster server nodes 115 having processing capacity, network bandwidth, and/or other availability to transform and/or otherwise process one or more data chunks associated with the logical view). Subsequently, data transformation computing platform 110 may determine a uniform size of the plurality of data chunks associated with the logical view based on the one or more available nodes. For instance, data transformation computing platform 110 may determine a uniform size of the plurality of data chunks to equally split the data received from traditional database server 130 across all of the one or more available nodes (e.g., all of the nodes included in cluster server nodes 115 identified by data transformation computing platform 110 as being available to transform and/or otherwise process one or more data chunks associated with the logical view).

In some embodiments, a numerical column included in the logical view of the data table associated with the first database maintained by the first database server may provide an index indicative of a total size of the source data associated with the logical view, and splitting the source data associated with the logical view to produce the plurality of data chunks associated with the logical view may include splitting the source data associated with the logical view based on the numerical column. For example, a numerical column included in the logical view of the data table associated with the first database maintained by the first database server (e.g., traditional database server 130) may provide an index indicative of a total size of the source data associated with the logical view (which may, e.g., be queried by data transformation computing platform 110 to obtain the data that is split at step 211, as discussed above). In addition, in splitting the source data associated with the logical view to produce the plurality of data chunks associated with the logical view (e.g., at step 211), data transformation computing platform 110 may split the source data associated with the logical view based on the numerical column. For instance, the numerical column may indicate a total number of rows included in the data table from which the source data associated with the logical view is obtained, and data transformation computing platform 110 may split the source data into subsets of data having the same number of rows to create data chunks of equal size. By splitting the source data associated with the logical view in this way, data transformation computing platform 110 may provide load balancing and/or otherwise balance the processing load across the nodes (e.g., cluster server nodes 115) that will transform the data into the new database schema in the steps described below.

At step 212, data transformation computing platform 110 may move the split data to various nodes of cluster server nodes 115 to be transformed and/or otherwise processed. For example, at step 212, data transformation computing platform 110 may move the plurality of data chunks associated with the logical view to a plurality of nodes (e.g., cluster server nodes 115) associated with the computing platform (e.g., data transformation computing platform 110). In addition, each node of the plurality of nodes (e.g., cluster server nodes 115) associated with the computing platform (e.g., data transformation computing platform 110) may be configured to receive a particular data chunk of the plurality of data chunks associated with the logical view and transform the particular data chunk of the plurality of data chunks associated with the logical view from the first schema to a second schema different from the first schema. For instance, in transforming a particular data chunk of the plurality of data chunks associated with the logical view, each node of the plurality of nodes (e.g., cluster server nodes 115) associated with the computing platform (e.g., data transformation computing platform 110) may be configured to read, repackage, and/or otherwise convert data included in and/or otherwise associated with the particular data chunk of the plurality of data chunks associated with the logical view from the first schema to a second schema different from the first schema.

In some embodiments, the first schema may be a relational database schema. For example, the first schema (e.g., of the source data associated with the logical view) may be a relational database schema, such as a SQL schema. In some embodiments, the second schema may be a non-relational database schema. For example, the second schema (e.g., into which the source data associated with the logical view may be transformed by data transformation computing platform 110 and/or cluster server nodes 115) may be a non-relational database schema, such as a NoSQL schema.

In some embodiments, the plurality of nodes associated with the computing platform may be configured to process the plurality of data chunks associated with the logical view in parallel. For example, the plurality of nodes (e.g., cluster server nodes 115) associated with the computing platform (e.g., data transformation computing platform 110) may be configured to process the plurality of data chunks associated with the logical view in parallel, such that each node of the plurality of nodes (e.g., cluster server nodes 115) associated with the computing platform (e.g., data transformation computing platform 110) may be configured to transform a particular data chunk of the plurality of data chunks associated with the logical view substantially contemporaneously with and/or while the other node(s) of the plurality of nodes (e.g., cluster server nodes 115) associated with the computing platform (e.g., data transformation computing platform 110) are transforming their respective data chunk(s) of the plurality of data chunks associated with the logical view.

Figure 2D:
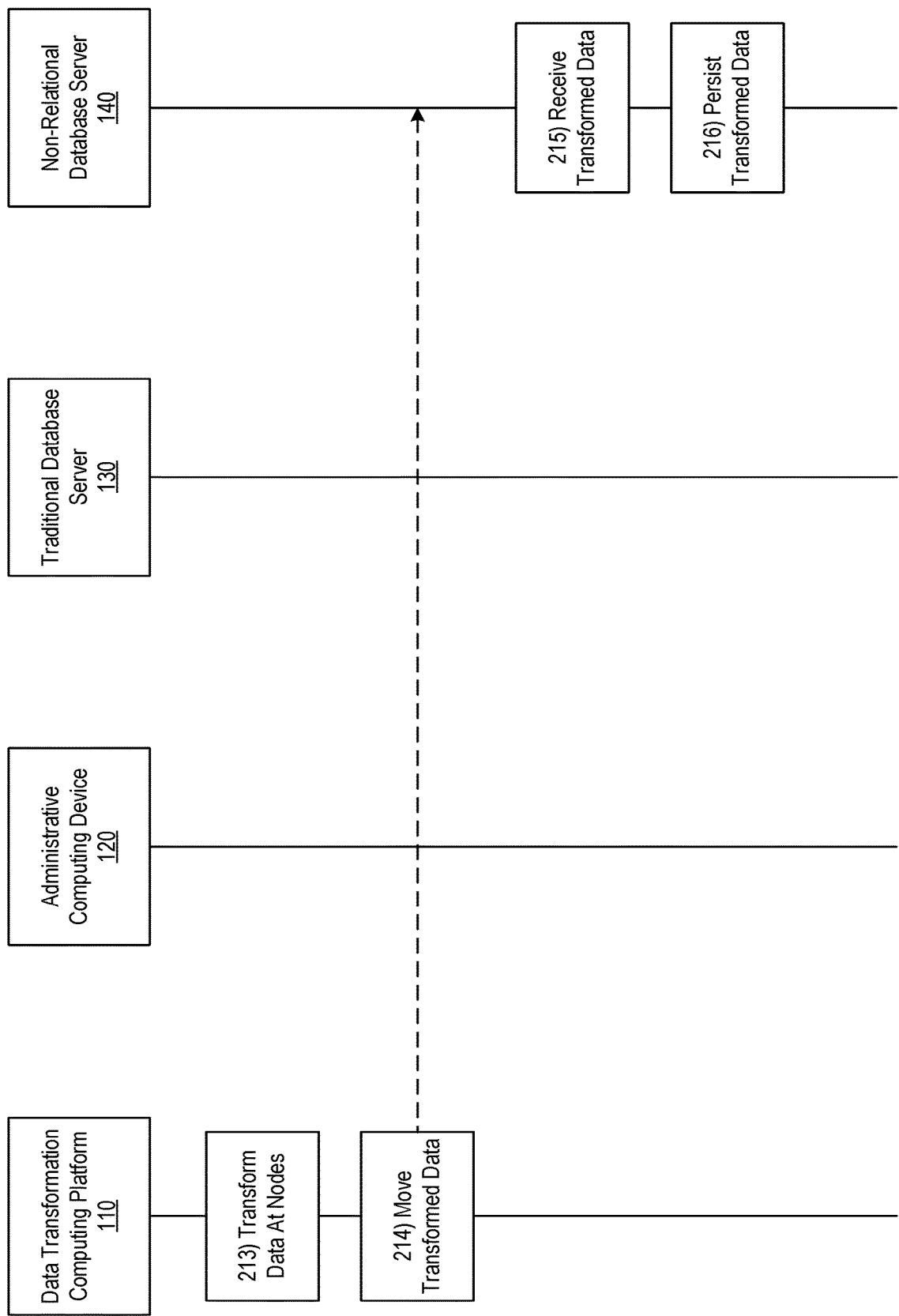

Referring to FIG. 2D, at step 213, data transformation computing platform 110 may transform the data at cluster server nodes 115 (e.g., from the first schema to the second schema). For example, at step 213, data transformation computing platform 110 may command the plurality of nodes (e.g., cluster server nodes 115) associated with the computing platform (e.g., data transformation computing platform 110) to transform the plurality of data chunks associated with the logical view to produce transformed data.

In some embodiments, commanding the plurality of nodes associated with the computing platform to transform the plurality of data chunks associated with the logical view to produce the transformed data may include initiating a data transformation process at the plurality of nodes associated with the computing platform and directing the plurality of nodes associated with the computing platform to transfer the transformed data to the second database maintained by the second database server when the data transformation process is completed. For example, in commanding the plurality of nodes (e.g., cluster server nodes 115) associated with the computing platform (e.g., data transformation computing platform 110) to transform the plurality of data chunks associated with the logical view to produce the transformed data at step 213, data transformation computing platform 110 may initiate a data transformation process at the plurality of nodes (e.g., cluster server nodes 115) associated with the computing platform (e.g., data transformation computing platform 110). In addition, data transformation computing platform 110 may direct the plurality of nodes (e.g., cluster server nodes 115) associated with the computing platform (e.g., data transformation computing platform 110) to transfer the transformed data to the second database maintained by the second database server (e.g., non-relational database server 140) when the data transformation process is completed.

At step 214, data transformation computing platform 110 may move the transformed data from cluster server nodes 115 to non-relational database server 140. For example, at step 214, data transformation computing platform 110 may move the transformed data from the plurality of nodes (e.g., cluster server nodes 115) associated with the computing platform (e.g., data transformation computing platform 110) to a second database maintained by a second database server (e.g., non-relational database server 140) in the second schema. In moving the transformed data from the plurality of nodes (e.g., cluster server nodes 115) associated with the computing platform (e.g., data transformation computing platform 110) to the second database maintained by the second database server (e.g., non-relational database server 140), data transformation computing platform 110 and/or cluster server nodes 115 may transmit and/or otherwise send (e.g., via communication interface 113 and/or one or more communication interfaces included in and/or connected to cluster server nodes 115) the transformed data to the second database server (e.g., non-relational database server 140), so that the second database server (e.g., non-relational database server 140) may store and/or persist the transformed data.

In some embodiments, moving the transformed data from the plurality of nodes associated with the computing platform to the second database maintained by the second database server may include moving the transformed data from the plurality of nodes associated with the computing platform to the second database maintained by the second database server using at least one application programming interface function call provided by the second database server. For example, in moving the transformed data from the plurality of nodes (e.g., cluster server nodes 115) associated with the computing platform (e.g., data transformation computing platform 110) to the second database maintained by the second database server (e.g., non-relational database server 140), data transformation computing platform 110 and/or cluster server nodes 115 may move the transformed data from the plurality of nodes (e.g., cluster server nodes 115) associated with the computing platform (e.g., data transformation computing platform 110) to the second database maintained by the second database server (e.g., non-relational database server 140) using at least one application programming interface (API) function call provided by the second database server (e.g., non-relational database server 140). For instance, data transformation computing platform 110 and/or cluster server nodes 115 may move the transformed data from cluster server nodes 115 to non-relational database server 140 by making and/or otherwise using an API call, and such an API call may be made by each node included in cluster server nodes 115 once it has finished transforming and/or otherwise processing its respective data chunk to transfer its corresponding transformed data to non-relational database server 140.

Figure 4:
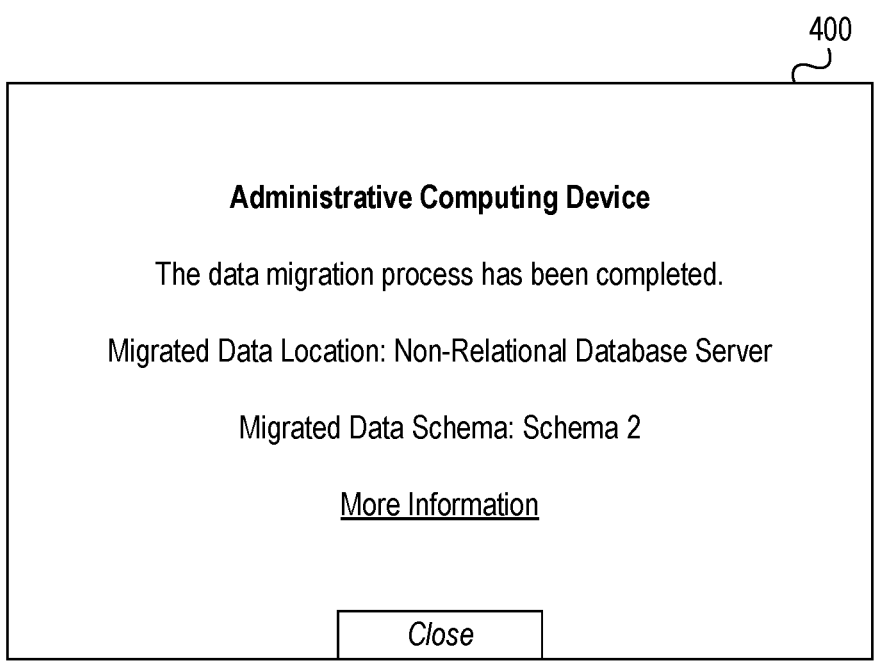

In some instances, responsive to and/or after moving the transformed data from the plurality of nodes (e.g., cluster server nodes 115) associated with the computing platform (e.g., data transformation computing platform 110) to the second database maintained by the second database server (e.g., non-relational database server 140), data transformation computing platform 110 may direct and/or otherwise cause a computing device, such as administrative computing device 120, to display and/or otherwise present a graphical user interface similar to graphical user interface 400, which is illustrated in FIG. 4. As seen in FIG. 4, graphical user interface 400 may include information notifying a user of administrative computing device 120 that a data migration process has been completed, as well as information associated with the data migration process that has been completed (e.g., "Migrated Data Location: Non-Relational Database Server Migrated Data Schema: Schema 2; More Information").

At step 215, non-relational database server 140 may receive the transformed data from data transformation computing platform 110 and/or cluster server nodes 115. As discussed above, the transformed data received by non-relational database server 140 from data transformation computing platform 110 and/or cluster server nodes 115 may have been converted and/or otherwise transformed into the second scheme (e.g., a non-relational schema, such as NoSQL) that may be used by non-relational database server 140 in storing and/or otherwise maintaining one or more databases, including the second database into which the transformed data received from data transformation computing platform 110 and/or cluster server nodes 115 may be added. At step 216, non-relational database server 140 may persist and/or otherwise store the transformed data received from data transformation computing platform 110 and/or cluster server nodes 115.

Figure 5:
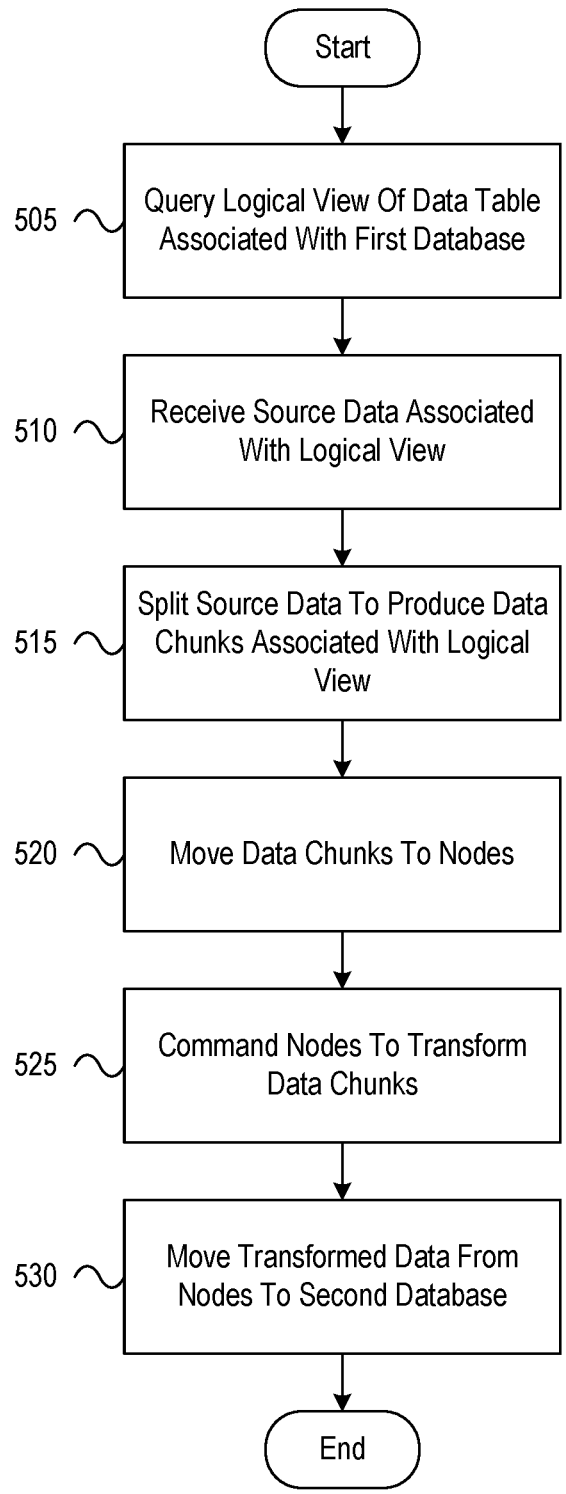
FIG. 5 depicts an illustrative method for transforming data structures and data objects to transfer data between databases having different schemas in accordance with one or more example embodiments.

FIG. 5 depicts an illustrative method for transforming data structures and data objects to transfer data between databases having different schemas in accordance with one or more example embodiments. Referring to FIG. 5, at step 505, a computing platform having at least one processor, a communication interface, and memory may query a logical view of a data table associated with a first database maintained by a first database server in a first schema. At step 510, responsive to querying the logical view of the data table associated with the first database maintained by the first database server in the first schema, the computing platform may receive, via the communication interface, from the first database server, source data associated with the logical view. At step 515, the computing platform may split the source data associated with the logical view to produce a plurality of data chunks associated with the logical view. At step 520, the computing platform may move the plurality of data chunks associated with the logical view to a plurality of nodes associated with the computing platform, and each node of the plurality of nodes associated with the computing platform may be configured to receive a particular data chunk of the plurality of data chunks associated with the logical view and transform the particular data chunk of the plurality of data chunks associated with the logical view from the first schema to a second schema different from the first schema. At step 525, the computing platform may command the plurality of nodes associated with the computing platform to transform the plurality of data chunks associated with the logical view to produce transformed data. At step 530, the computing platform may move the transformed data from the plurality of nodes associated with the computing platform to a second database maintained by a second database server in the second schema.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   query a logical view of a data table associated with a first database maintained by a first server in a first schema;
   responsive to querying the logical view of the data table associated with the first database maintained by the first server in the first schema, receive, via the communication interface, from the first server, source data associated with the logical view;
   split the source data associated with the logical view to produce a plurality of data chunks associated with the logical view;
   move the plurality of data chunks associated with the logical view to a plurality of nodes associated with the computing platform;
   command the plurality of nodes associated with the computing platform to transform the plurality of data chunks associated with the logical view to produce transformed data; and
   move the transformed data from the plurality of nodes associated with the computing platform to a second database maintained by a second server in a second schema different from the first schema,
   wherein splitting the source data associated with the logical view to produce the plurality of data chunks associated with the logical view comprises identifying one or more available nodes and determining a uniform size of the plurality of data chunks associated with the logical view based on the one or more available nodes,
   wherein a numerical column included in the logical view of the data table associated with the first database maintained by the first server provides an index indicative of a total size of the source data associated with the logical view, and
   wherein splitting the source data associated with the logical view to produce the plurality of data chunks associated with the logical view comprises splitting the source data associated with the logical view based on the numerical column to balance processing load across the one or more available nodes.

2. The computing platform of claim 1, wherein the memory stores additional computer-readable instructions that, when executed by the at least one processor, cause the computing platform to:
   prior to querying the logical view of the data table associated with the first database maintained by the first server in the first schema:
   receive, via the communication interface, from an administrative computing device, a data migration command;
   responsive to receiving the data migration command from the administrative computing device, generate a view command directing the first server to create the logical view of the data table associated with the first database maintained by the first server; and
   send, via the communication interface, to the first server, the view command directing the first server to create the logical view of the data table associated with the first database maintained by the first server.

3. The computing platform of claim 2, wherein the view command directing the first server to create the logical view of the data table associated with the first database maintained by the first server is configured to cause the first server to execute a script that creates the logical view of the data table associated with the first database maintained by the first server.

4. The computing platform of claim 1, wherein the first schema is a relational database schema.

5. The computing platform of claim 4, wherein the second schema is a non-relational database schema.

6. The computing platform of claim 1, wherein the plurality of nodes associated with the computing platform are configured to process the plurality of data chunks associated with the logical view in parallel.

7. The computing platform of claim 1, wherein commanding the plurality of nodes associated with the computing platform to transform the plurality of data chunks associated with the logical view to produce the transformed data comprises initiating a data transformation process at the plurality of nodes associated with the computing platform and directing the plurality of nodes associated with the computing platform to transfer the transformed data to the second database maintained by the second server when the data transformation process is completed.

8. The computing platform of claim 1, wherein moving the transformed data from the plurality of nodes associated with the computing platform to the second database maintained by the second server comprises moving the transformed data from the plurality of nodes associated with the computing platform to the second database maintained by the second server using at least one application programming interface function call provided by the second server.

9. A method, comprising:
at a computing platform comprising at least one processor, memory, and a communication interface:
querying, by the at least one processor, a logical view of a data table associated with a first database maintained by a first server in a first schema;
responsive to querying the logical view of the data table associated with the first database maintained by the first server in the first schema, receiving, by the at least one processor, via the communication interface, from the first server, source data associated with the logical view;
splitting, by the at least one processor, the source data associated with the logical view to produce a plurality of data chunks associated with the logical view;
moving, by the at least one processor, the plurality of data chunks associated with the logical view to a plurality of nodes associated with the computing platform;
commanding, by the at least one processor, the plurality of nodes associated with the computing platform to transform the plurality of data chunks associated with the logical view to produce transformed data; and
moving, by the at least one processor, the transformed data from the plurality of nodes associated with the computing platform to a second database maintained by a second server in a second schema different from the first schema,
wherein splitting the source data associated with the logical view to produce the plurality of data chunks associated with the logical view comprises identifying one or more available nodes and determining a uniform size of the plurality of data chunks associated with the logical view based on the one or more available nodes,
wherein a numerical column included in the logical view of the data table associated with the first database maintained by the first server provides an index indicative of a total size of the source data associated with the logical view, and
wherein splitting the source data associated with the logical view to produce the plurality of data chunks associated with the logical view comprises splitting the source data associated with the logical view based on the numerical column to balance processing load across the one or more available nodes.

10. The method of claim 9, comprising:
prior to querying the logical view of the data table associated with the first database maintained by the first server in the first schema:
receiving, by the at least one processor, via the communication interface, from an administrative computing device, a data migration command;
responsive to receiving the data migration command from the administrative computing device, generating, by the at least one processor, a view command directing the first server to create the logical view of the data table associated with the first database maintained by the first server; and
sending, by the at least one processor, via the communication interface, to the first server, the view command directing the first server to create the logical view of the data table associated with the first database maintained by the first server.

11. The method of claim 10, wherein the view command directing the first server to create the logical view of the data table associated with the first database maintained by the first server is configured to cause the first server to execute a script that creates the logical view of the data table associated with the first database maintained by the first server.

12. The method of claim 9, wherein the first schema is a relational database schema.

13. The method of claim 12, wherein the second schema is a non-relational database schema.

14. The method of claim 9, wherein the plurality of nodes associated with the computing platform are configured to process the plurality of data chunks associated with the logical view in parallel.

15. The method of claim 9, wherein commanding the plurality of nodes associated with the computing platform to transform the plurality of data chunks associated with the logical view to produce the transformed data comprises initiating a data transformation process at the plurality of nodes associated with the computing platform and directing the plurality of nodes associated with the computing platform to transfer the transformed data to the second database maintained by the second server when the data transformation process is completed.

16. The method of claim 9, wherein moving the transformed data from the plurality of nodes associated with the computing platform to the second database maintained by the second server comprises moving the transformed data from the plurality of nodes associated with the computing platform to the second database maintained by the second server using at least one application programming interface function call provided by the second server.

17. One or more non-transitory computer-readable media storing instructions that, when executed by a computing platform comprising at least one processor, memory, and a communication interface, cause the computing platform to:

query a logical view of a data table associated with a first database maintained by a first server in a first schema;

responsive to querying the logical view of the data table associated with the first database maintained by the first server in the first schema, receive, via the communication interface, from the first server, source data associated with the logical view;

split the source data associated with the logical view to produce a plurality of data chunks associated with the logical view;

move the plurality of data chunks associated with the logical view to a plurality of nodes associated with the computing platform;

command the plurality of nodes associated with the computing platform to transform the plurality of data chunks associated with the logical view to produce transformed data; and move the transformed data from the plurality of nodes associated with the computing platform to a second database maintained by a second server in a second schema different from the first schema, wherein splitting the source data associated with the logical view to produce the plurality of data chunks associated with the logical view comprises identifying one or more available nodes and determining a uniform size of the plurality of data chunks associated with the logical view based on the one or more available nodes, wherein a numerical column included in the logical view of the data table associated with the first database maintained by the first server provides an index indicative of a total size of the source data associated with the logical view, and wherein splitting the source data associated with the logical view to produce the plurality of data chunks associated with the logical view comprises splitting the source data associated with the logical view based on the numerical column to balance processing load across the one or more available nodes.

18. The one or more non-transitory computer-readable media of claim 17, storing additional instructions that, when executed by the computing platform, cause the computing platform to:

prior to querying the logical view of the data table associated with the first database maintained by the first server in the first schema:

receive, via the communication interface, from an administrative computing device, a data migration command;

responsive to receiving the data migration command from the administrative computing device, generate a view command directing the first server to create the logical view of the data table associated with the first database maintained by the first server; and send, via the communication interface, to the first server, the view command directing the first server to create the logical view of the data table associated with the first database maintained by the first server.

19. The one or more non-transitory computer-readable media of claim 18, wherein the view command directing the first server to create the logical view of the data table associated with the first database maintained by the first server is configured to cause the first server to execute a script that creates the logical view of the data table associated with the first database maintained by the first server.

20. The one or more non-transitory computer-readable media of claim 17, wherein the first schema is a relational database schema, and wherein the second schema is a non-relational database schema.

* * * * *